United States Patent
Blair et al.

(10) Patent No.: US 7,130,528 B2
(45) Date of Patent: Oct. 31, 2006

(54) AUDIO DATA DELETION AND SILENCING DURING TRICK MODE REPLAY

(75) Inventors: Ronald Lynn Blair, Carmel, IN (US); Shu Lin, Indianapolis, IN (US); Mark Alan Schultz, Carmel, IN (US); Robert Warren Schmidt, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1156 days.

(21) Appl. No.: 10/086,984

(22) Filed: Mar. 1, 2002

(65) Prior Publication Data

US 2003/0165321 A1    Sep. 4, 2003

(51) Int. Cl.
*H04N 5/91* (2006.01)

(52) U.S. Cl. ........................................ 386/75
(58) Field of Classification Search .............. None
See application file for complete search history.

(56) References Cited

U.S. PATENT DOCUMENTS

| | | | | |
|---|---|---|---|---|
| 4,376,874 A | * | 3/1983 | Karban et al. | 704/215 |
| 5,687,275 A | * | 11/1997 | Lane et al. | 386/68 |
| 5,893,062 A | * | 4/1999 | Bhadkamkar et al. | 704/270 |
| 6,154,603 A | * | 11/2000 | Willis et al. | 386/125 |
| 6,292,454 B1 | | 9/2001 | Hu | |
| 6,353,703 B1 | * | 3/2002 | Tatsumi et al. | 386/104 |
| 6,356,211 B1 | * | 3/2002 | Shimoyoshi et al. | 341/50 |

FOREIGN PATENT DOCUMENTS

| | | |
|---|---|---|
| EP | 0371717 A2 | 6/1990 |
| EP | 1115151 A2 | 7/2001 |
| JP | 07220336 | 8/1995 |
| JP | 2000023105 | 1/2000 |

OTHER PUBLICATIONS

Supplementary European Search Report, Aug. 26, 2005.

\* cited by examiner

*Primary Examiner*—Thai Tran
*Assistant Examiner*—Heather R. Jones
(74) *Attorney, Agent, or Firm*—Joseph J. Laks; Robert B. Levy; Jorge Tony Villabon

(57) ABSTRACT

The invention concerns a method and apparatus for audio program playback during fast forward playback video trick modes. A storage medium reader can be configured to read coded digital data from a storage medium such as a DVD. The coded digital data can be a video presentation having correspondingly formatted video and audio frames. An audio processor can insert silence frames in a selected block of the audio frames and portions of the audio frames can be deleted to compensate for video trick mode playback. Resulting audio frames can be concatenated to create 1× audio for various video trick modes playback.

20 Claims, 3 Drawing Sheets

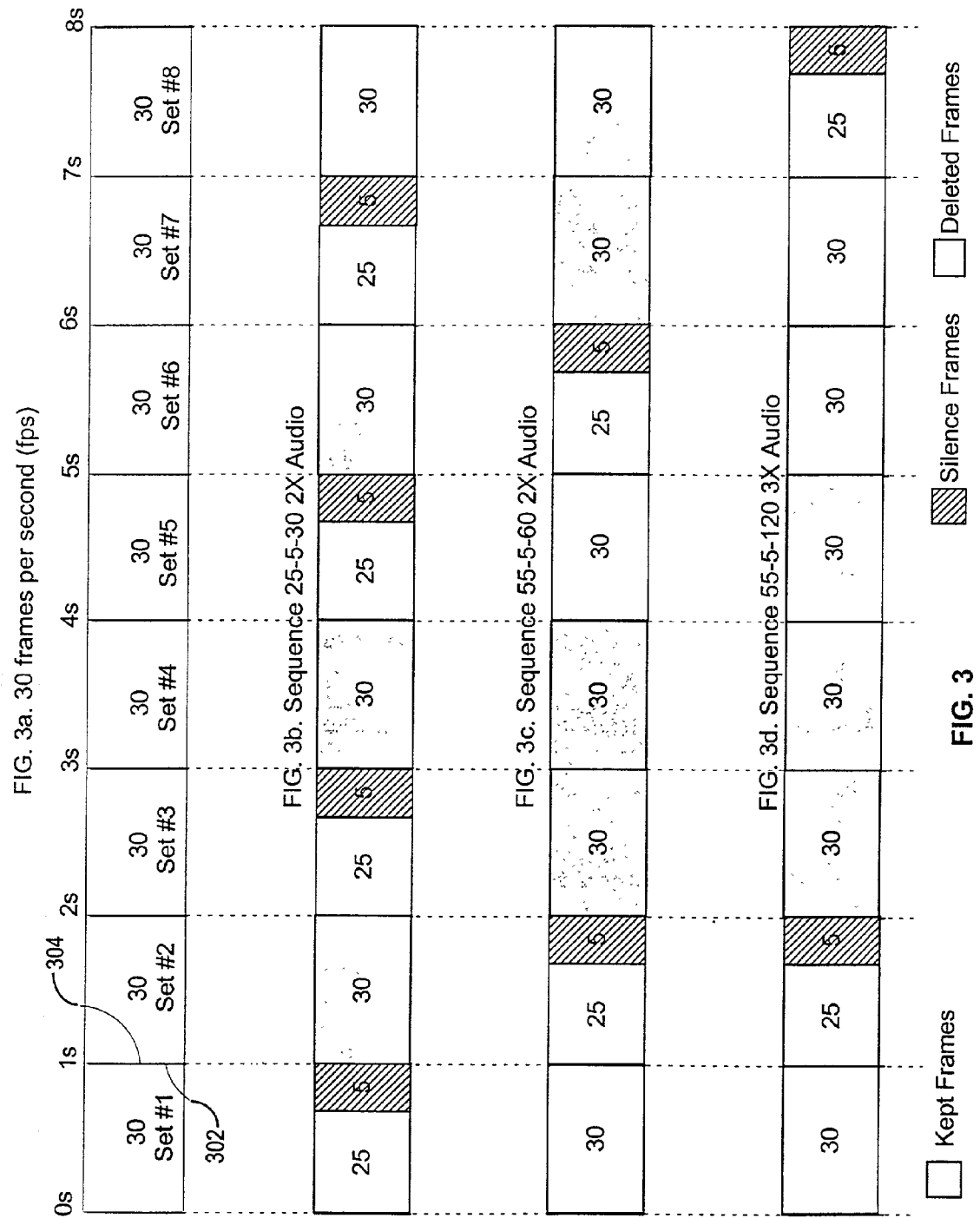

AUDIO DATA DELETION AND SILENCING DURING TRICK MODE REPLAY

BACKGROUND OF THE INVENTION

1. Technical Field

The invention concerns improved trick mode playback, and more particularly to improvements in the trick mode playback of audio programming associated with a video segment played back at other than normal speed.

2. Description of the Related Art

DVD trick modes can include speedup or slowdown of normal playback to either search for a specific location on the disc or to look at details of a clip that would normally be missed at normal speed. By convention, normal playback speed can be denoted as 1×. Both audio and video trick modes are possible and both can be found on commercially available DVD players. However, conventional methods for playback of audio at fast or slow speed have proved to be problematic. The advancement of digital signal processors and especially audio digital signal processors that are used in currently available products have created the possibility for more sophisticated real-time processing for improved audio trick modes.

One problem with the use of video trick modes concerns the treatment of audio corresponding to a playback video segment. For example, when a user speeds up or slows down a displayed video segment, the corresponding audio segment that is played back can be distorted. Typically, audio samples in the audio segment can be shifted to higher frequencies during a fast trick mode, and lower frequencies during a slow trick mode. The fast trick modes that increase the playback speed by a factor of between about 1.5 to 3 times as compared to normal playback will tend to cause human speech to sound higher in pitch. This higher pitched audio playback, the chipmunk effect, can be annoying and in many instances may be unintelligible for a listener. Conversely, slow frequency trick modes can produce a low frequency wobble that may be understandable but not aurally pleasing.

In order to obtain the most useful audio playback during video trick modes as described herein, it is also necessary to consider the nature of the particular trick mode. For example, while it may be possible to utilize various techniques to provide intelligible audio for 1.5× or 2× trick modes, such techniques may provide unsatisfactory results when the trick mode involves playback at 5× or 10×. At such high rate playback speeds, any attempt to play back an audio soundtrack synchronized with the video may result in unintelligible speech due to the very rapid rate at which words would need to be presented.

To avoid hearing various types of audio artifacts that can be caused by DVD trick modes, conventional DVD players will often mute the audio during video trick modes. However, this is not an entirely satisfactory solution as the audio may be of interest in such modes. Accordingly, it would be advantageous if a DVD player could playback audio in a manner that overcomes the limitations of the prior art and achieve a desirable and aurally pleasant playback of audio during video trick modes.

SUMMARY OF THE INVENTION

The invention concerns a method and apparatus for playing an audio programming during a fast forward video trick mode playback of a video presentation. The method involves reading coded digital data from a storage medium where the coded digital data comprises video frames and corresponding audio frames for the video presentation; periodically dropping selected blocks of the audio frames, and selecting at least a portion of a remaining set of blocks for audio playback. In order to delineate between successive ones the remaining set of blocks for audio playback periods of silence are inserted between the successive blocks. The system generates an audio playback signal corresponding to the remaining set of blocks for audio playback and the periods of silence. In order to enhance intelligibility, the playback of the remaining set of blocks for audio playback is advantageously performed at a rate of between about 1× and 1.5×, regardless of the video trick mode playback speed. The periods of silence are selectively chosen to be of sufficient length to allow a listener to delineate between successive blocks selected for audio playback. For example, periods of silence between about 100 to 500 milliseconds have been found to work well. Shorter periods of silence render it difficult to perceive separation between successive audio blocks. Longer periods of silence produce excessively long dead-air time when the user is receiving no audio information.

The periods of silence can be inserted by either muting a portion of the remaining set of blocks for audio playback, or by inserting a plurality of audio frames representatively coded to produce silence. The periodic dropping of the selected blocks of the audio frames, selection of the remaining set of blocks for audio playback and insertion of periods of silence are preferably performed at a rate corresponding to a selected speed of the video trick mode. However, the time for playback of the remaining set of blocks for audio playback can extend beyond playback of a corresponding portion of the video presentation to which the remaining set of blocks for audio playback were originally associated.

The storage medium can be selected from the group consisting of a DVD, a magnetic hard disk, a video CD and a solid state memory device. The coded digital data can preferably be an MPEG format and in that case the reading step further comprises decoding an MPEG formatted bit stream to obtain audio samples.

BRIEF DESCRIPTION OF THE DRAWINGS

FIG. 3 is an exemplary block diagram that is useful for understanding the insertion and deletion of frames in accordance with the inventive arrangements.

DETAILED DESCRIPTION

The present invention can be used for performing normal playback of audio programming during video trick modes for any type of digital video recorded on any suitable digital data storage medium. For convenience, the invention shall be described in the context of a DVD medium utilizing conventional MPEG-1 or MPEG-2 format. However, those skilled in the art will appreciate that the invention is not limited in this regard. The digital data storage medium can include any media that is capable of storing substantial amounts of digital data for retrieval and playback at a subsequent time. As used herein, a storage medium can include, but is not limited to, optical, magnetic and electronic means for storing data. Exemplary digital storage media can include an optical digital versatile disk (DVD), a magneto optical disk, a magnetic hard disk, a video CD or regular CD, or solid-state memory such as dynamic random access memory (DRAM) or synchronous DRAM (SDRAM).

Figure 1:
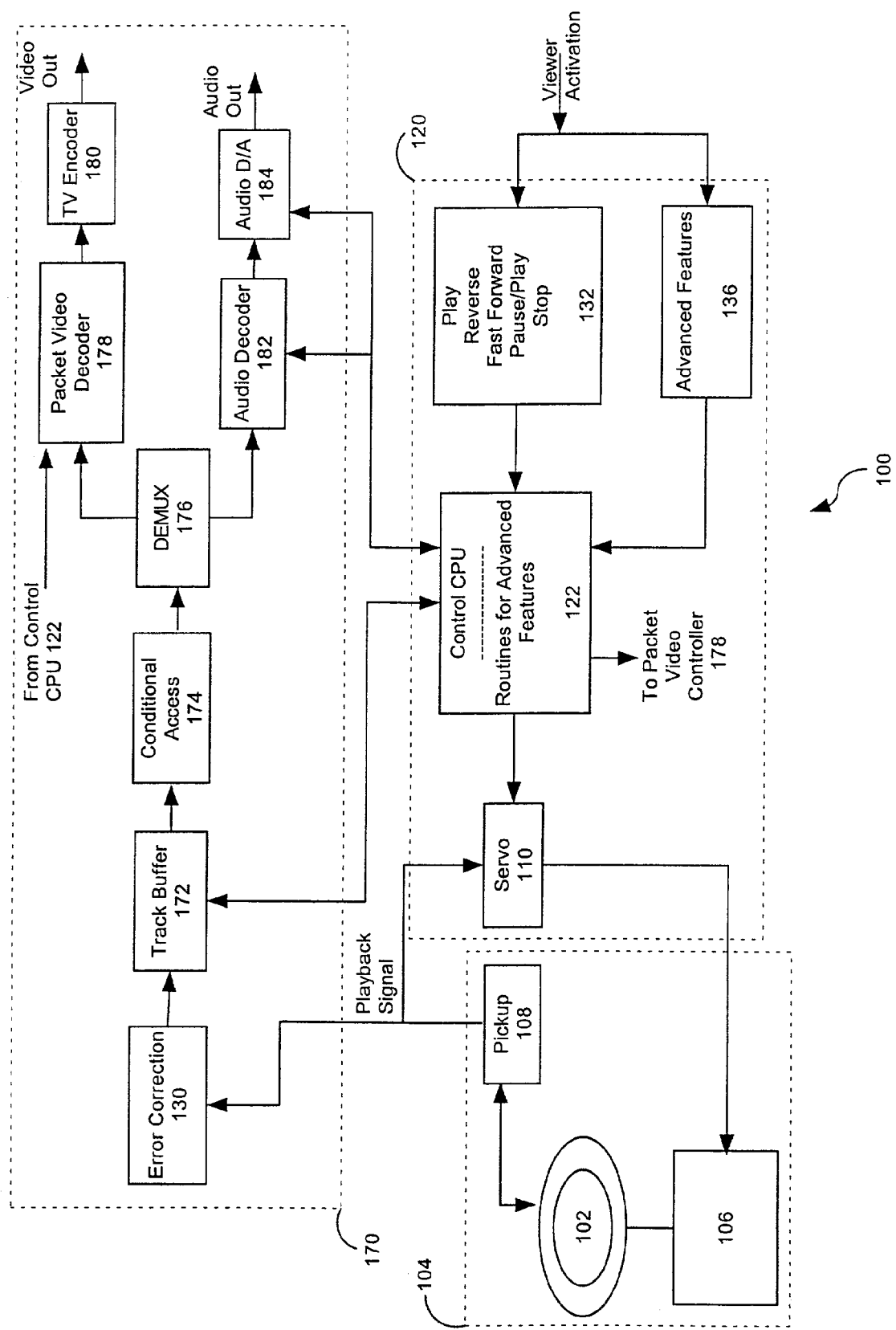
FIG. 1 is a block diagram of a DVD device that can be provided with one or more advanced operating functions in accordance with the inventive arrangements.

A storage medium reader is provided for reading coded digital data from a digital data storage medium. FIG. 1 is a block diagram of an exemplary DVD video player in which the present invention may be implemented. The device 100 can have the capability to read stored data from a digital storage medium. Referring to FIG. 1, the storage medium disk 102, can be a re-writable DVD. Device 100 can include a mechanical assembly 104, a control section 120, and a audio/video (A/V) output processing section 170. The allocation of most of the blocks to different sections is self-evident, whereas the allocation of some of the blocks is made for purposes of convenience and is not critical to understanding the operation of the device 100. Importantly, it should be recognized that if the digital data storage medium were a solid-state device, the mechanical assembly 104 would not be necessary to practice the invention. In this case, the coded digital data stored in the digital storage medium can be directly accessed by control CPU 122 and buffered in track buffer 172.

Notwithstanding, the mechanical assembly 104 can include a motor 106 for spinning the disk 102 and a pickup assembly 108 adapted to be moved over the spinning disk 102. A laser mounted on, or associated with the pickup assembly 108 can illuminate data stored onto the track for playing back video and/or audio program data. For purposes of understanding the invention, it is irrelevant whether the disk is a recordable type. The laser associated with the pickup assembly 108 and the motor 106 can be controlled by a servo 110. The servo 110 can also be configured to receive a input playback signal representing data read from spiral tracks on DVD disk 102. The playback signal can also serve as an input to an error correction circuit 130, which can be considered part of the control section 120 or part of the A/V output processing section 170.

The control section 120 can include a control central processing unit (CPU) 122. The servo 110 can also be considered part of the control section 120. Suitable software or firmware can be provided in a memory for the conventional operations performed by control CPU 122. In addition, program routines for the advanced features as described herein can be provided for controlling CPU 122.

A control buffer 132 for viewer activatable functions can be configured to 30 indicate those functions presently available, namely play, reverse, fast forward, slow play, pause/play and stop. The pause function is analogous to pause operation typically found on most videocassette recorders (VCRs). The pause function can have the capability to manual interrupt the play back of a prerecorded presentation in order to eliminate undesired segments such as advertisements, trailers etc. from a playback. Advanced features buffer 136 can be provided for implementing other advanced playback functions, including control of trick modes as described herein. Playback trick modes can include forward and reverse playback at speeds other than standard 1× playback speed.

The output processing section 170 can include an error correction block 130 and a track buffer or output buffer 172, in which data read from the disc can be buffered and assembled into packets for further processing. The packets can be processed by conditional access circuit 174 that controls propagation of the packets through demultiplexer 176 and into respective paths for video and audio processing. The video can be decoded by decoder 178, for example from MPEG-1 or MPEG-2 formats, and encoded in a standardized television signal format such as ATSC, NTSC, SECAM or PAL. The audio can be decoded by decoder 182, for example from MPEG-1 or MPEG-2 formats, and converted to analog form by audio digital-to-analog (D/A) converter 184. The audio D/A 184 can process digital audio received from the audio decoder 182 and produce an analog output signal.

Audio decoder 182 preferably includes a frame buffer for temporarily storing audio frames prior to decoding. The operation of audio decoder 182 can be controlled by control CPU 122. Thus, control CPU 122 can control the operation of the audio decoder, including causing it to selectively drop frames, mute audio for certain frames, insert frames with silence only, and decode only selected frames as control CPU may designate. These actions may be performed in the audio decoder. As will be appreciated, however, the invention is not limited in this regards and such processing of the audio frames can be handled by other processing elements inserted before or after the audio decoder 182. Finally, such processing can also be performed directly by the control CPU with communications provided by a suitable system communication bus. Generally all that is necessary in this regard is an audio frame buffer and an ability to selectively remove or modify frames that are to be played, dropped or silenced in accordance with the advantageous method to be described in greater detail.

Figure 2:
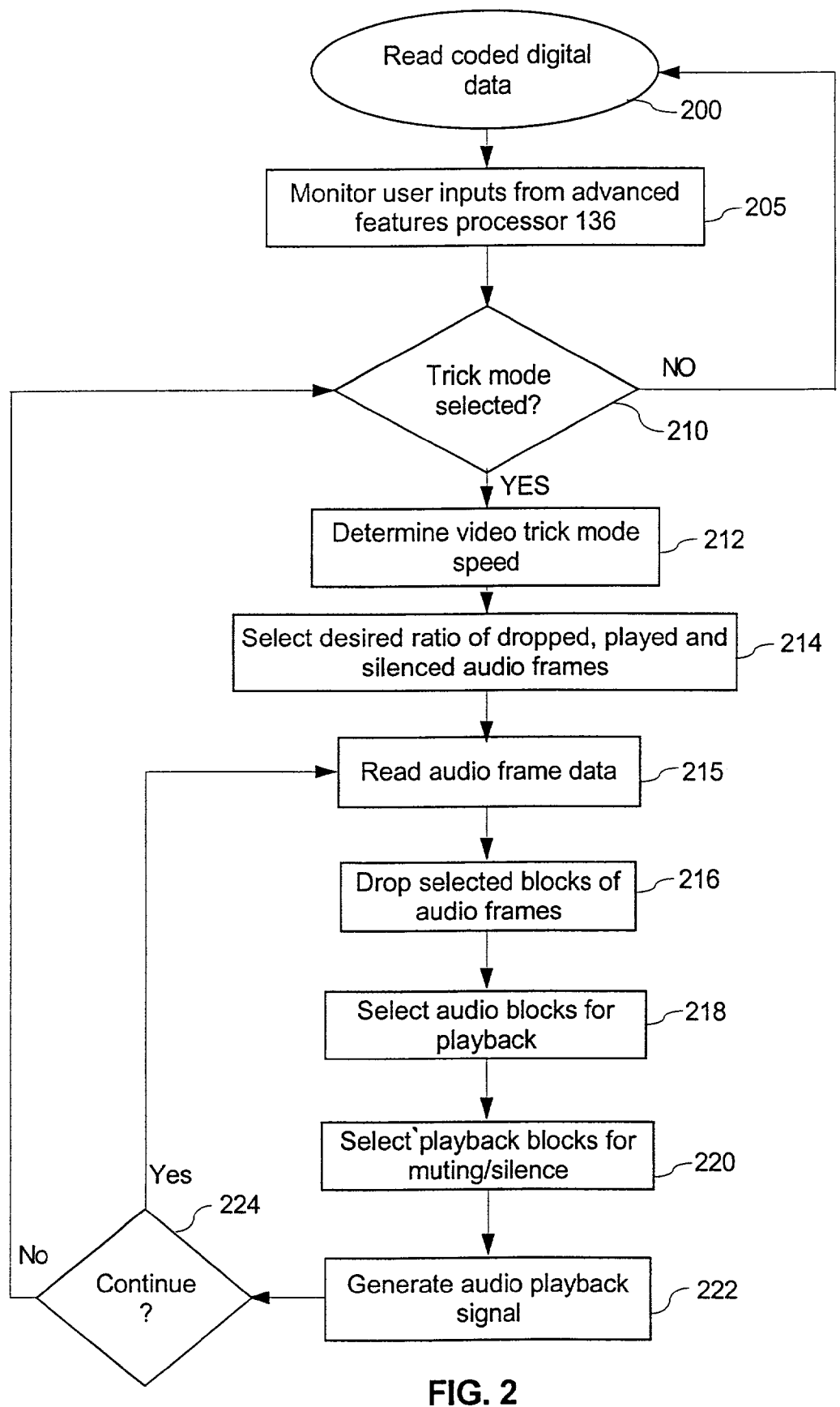
FIG. 2 is a flowchart that is useful for understanding the inventive arrangements as implemented in an exemplary media player such as device 100 of FIG. 1.

FIG. 2 is a flowchart that is useful for understanding the inventive arrangements as implemented in an exemplary media player such as device 100. The process illustrated in FIG. 2 is described relative to a fast forward playback since audio playback in reverse trick modes is generally required. It should be understood however, that the invention is not so limited. The inventive arrangements as described herein could be applied to reverse playback trick modes using techniques similar to those described in FIG. 2.

Referring to FIG. 2, the process can begin at step 200 when the device 100 is operated in a playback mode. In step 200, during playback mode, coded digital data can be read from the DVD storage medium 102. In step 205, control CPU 122 can monitor user inputs from advanced features buffer 136. In step 210, the control CPU 122 can determine whether the trick mode, for example fast forward playback speed, has been selected. If the trick mode is not selected in step 210, the control CPU 122 returns processing at step 200 and device 100 continues to read coded digital data from the DVD storage medium 102. In a case where the trick mode is selected, the control CPU 122 can continue to steps 212 through 224 for trick mode audio playback.

Since control CPU 122 has serviced an exemplary user command of, for example +2×, the trick mode speed is known at step 212 and thus the gross amount of audio deletion required is equal to the reciprocal of the trick play speed which in this case is ½, i.e. half the audio data is not to be decoded. At 214 control CPU 122 can select or calculate an advantageous sequence of audio data, having a duration quantified in TV frames, to be dropped, played and silenced to achieve the required amount or time duration of audio data for decoding, which in this example is ½ the replay data. Once this ratio has been calculated, the process can continue in step 215 by reading the next set of coded digital data comprising video frames and corresponding TV frame duration intervals of audio data associated with the trick mode playback. As used herein, a TV frame can refer to a common video frame having a duration of approximately 1/30 second. In an exemplary digital audio system with a sampling rate of 48 kHz approximately 1600 audio samples will occur within the period of one 30 Hz TV frame. However, the invention is not so limited and other frame rates can also be employed within the scope of the invention.

The following audio processing steps can be performed directly by the control CPU 122 or can be performed by making use of existing buffers and digital audio processing circuitry such as can be provided in the player 100. For example, audio decoder 182 can be used for this purpose under the control of control CPU 122.

In any case, in step 216 a block of audio frames corresponding to the coded digital data retrieved from the storage medium can be selectively processed in accordance the ratio of dropped, played and silenced TV frame intervals of audio data as calculated in step 214. The selective processing can be performed by attaching an indicator flag or header to indicate the processing type determined in step 214. These indicating flags or headers are stripped off during the selective processing. Thus at step 216 audio frames flagged or selected for dropping are deleted, or not read or extracted from the data stream. In step 218, at least a portion of a remaining set of the audio frames are flagged for playback and silencing in accordance with the ratio determined in step 214. Further, in step 220 a selected portion of the frames designated or flagged for silence are muted.

Playback audio silence can be achieved by muting the audio data processing. For example during digital to analog conversion the conversion can be inhibited or the audio output muted for an exemplary interval determined in video frames, having a duration of, for example 5 frames or about 166 milliseconds. Such muting methods require careful implementation to avoid the generation of unwanted transient audio distortion. Alternatively, muting selected ones of the audio data selected for playback, audio data representative of silence can be switched into the replay data stream to produce periods of silence, as determined in step 214 with the required duration in TV frame intervals. In addition other techniques can be employed to achieve decoded audio silence, for example, the required duration of audio silence can be pre-stored in a memory and read appropriately by redirecting a memory read pointer from the buffered replay audio stream to the stored silence in accordance with step 214. In another arrangement audio data to be silenced or muted can be marked as non-audio and therefore ignored by the digital to analog converter. However, this muting method requires careful implementation to avoid the generation of unwanted transient audio distortion in subsequent audio processing stages. In yet another arrangement muting can be achieved by asserting all zero values at the digital to analog converter input. Any of the silencing options can be used in step 220 provided that unwanted audio transients are avoided and the muting duration is consistent with the ratio of dropped, played, and silenced frame durations determined in step 214.

If a decision is made for muting selected frames in step 220, then control CPU 122, can execute a muting algorithm in order to mute consecutive audio data within the selected block of audio frames. Muting may be achieved as described previously or with algorithms known in the art and can be implemented in software or firmware as necessary.

In step 222, the trick mode audio playback signal can be generated by control CPU 122. The generated audio playback signal can consist of the sets of audio data that remain after step 216 and can include all the silenced or muted audio frames. The audio decoder 182 can concatenate the blocks of audio frames, which contain the remaining set of audio and silence representative data from which an audio playback signal can be formed during trick mode operation.

Following generation of the audio playback signal in step 222, a test is performed at step 224, to determine either to end the trick play mode and return to step 210 or continue the trick mode, for example fast forward playback speed, and repeat steps 215 through 222.

The processing of the video frames can be performed concurrently with the processing of the TV frame sized audio data sets. Control CPU 122 can configure packet video decoder 178 to perform trick mode video playback at speed n× where n is equal to the selected trick mode playback speed relative to a normal playback speed of 1×. For example, for a playback speed two times faster than normal, then n=2. There are a variety of ways in which packet video decoder 178 can be configured to provide video playback at faster than normal speeds. For example, the packet video decoder 178 can be configured to drop certain decoded video frames. For example, every other video frame can be dropped to provide the case of 2× playback. However, it will be appreciated that other approaches can also be used to alter the video playback speed and the invention is not limited to any particular method of implementing a faster than normal video playback. It should be recognized by one skilled in the art that the exemplary steps of FIG. 2 and the sequence shown therein are not intended to limit the scope of the invention. Consequently, other sequences of steps are possible without departing from the spirit of the invention. For example, steps 218, 220 and 222 can be performed prior to step 216.

FIG. 3 is an exemplary block diagram that is useful for understanding the insertion and deletion of TV frame duration sets of audio data in accordance with the inventive arrangements. As shown, FIG. 3 contains four figures, namely 3*a*, 3*b*, 3*c* and 3*d*. FIG. 3*a* is a diagram illustrating the boundaries for an exemplary selected 8 second block of consecutive audio data depicted with a TV frame rate of nominally 30 frames per second (fps). Each consecutive pair of boundaries, for example 302, 304 can represent the start and end of an audio set having a duration of 30 TV frames or nominally one second. The audio data can be arranged into sets, with each set containing data with a duration of 30 frames. The sets are numbered set 1 through set 8. The television frame rate is used as a time base for ease of understanding and the arrangement of frames into sets and their subsequent numbering is not intended to limit the invention, but is provided merely as an aid to understanding. FIG. 3*b*, FIG. 3*c*, and FIG. 3*d* are depicted with frame boundaries and sets aligned with those illustrated in FIG. 3*a*.

FIG. 3*b* depicts an exemplary sequence of audio frames for reproduction accompanying a 2× video trick mode. In accordance with the invention, FIG. 3*b* illustrates one possible arrangement for achieving a ratio of played, deleted and silenced frames. For example, the first time interval of 25 consecutive frames in set 1 can be retained for playback with the remaining interval of 5 frames muted by any of the methods described previously. In set 2, the next interval of 30 frames, contiguous with the five preceding muted or silenced frames, can be deleted, i.e. all the frames in set 2 can be deleted. For the duration of the first 25 consecutive frames in set 3 the audio data is retained for playback with the remaining five frames of set 3 muted or silenced. The next interval 30 frames of set 4, contiguous with the 5 silenced frames of set 3, can be deleted. In set 5 the first 25 consecutive frames audio data are marked for playback with the remaining 5 frames of set 5 muted. In frame 6 all 30 frames, contiguous to the 5 silent frames of set 5 are deleted.

For the first 25 frame interval in set 7 audio data is marked for playback with the remaining 5 frame duration muted. In set 8 all audio data is deleted for the duration of 30 frames. The trick mode audio playback can be formed by concatenating the remaining frames which comprises wanted, marked playback audio data plus muted or silence representative audio data. Thus the audio data stream can include set 1, set 3, set 5, and set 7. This can be called the 25-5-30 sequence, wherein 25 frames are retained, the next 5 consecutive frames can be silenced, and the next 30 consecutive frames can be deleted. The ratio of frames played, muted and dropped would be 5:1:6. Thus with a 2× video playback, the 25-5-30 sequence can result in a 1× audio playback rate with gaps or silences of 166 millisecond between successive blocks of audio data. This inventive audio processing sequence advantageously yields a replay audio signal which has an effective play speed of 1× and where the frequency of the content is not changed in pitch.

The formation of a playback audio signal with an effective play speed of 1×, results from, in the 2× example, the deletion of nominally 50% of the audio samples and the concatenation of the remaining audio data. The data concatenation can hinder intelligibility of the resulting audio signal. Thus to prevent sounds being run together applicants advantageously intersperse the selected repay audio samples with periods of silence or audio muting. In order to provide a sufficient gap or delineation between adjacent blocks of audio, a silence of at least approximately 100 milliseconds has been found to be preferable. These periods of silence permit the listener to distinguish between separate blocks of speech. Longer silences can also be used, but it has been found that periods of silence longer than about 500 milliseconds generally result in excessive amounts of silence and unnecessary listener psycho acoustic fatigue.

The exemplary depiction of audio segments shown in FIG. 3*b* illustrates one possible arrangement in accordance with the invention. However, it has been found that the FIG. 3*b*, 25-5-30 sequence of played, muted and dropped audio intervals can possibly result in the creation of truncated or nonsense words resulting from the relatively short intervals of replay audio. FIG. 3*c* illustrates further embodiment for arranging the selected blocks of frames in accordance with the inventive arrangements to yield a 1× audio playback rate with improved intelligibility. Advantageously, the audio sequence depicted in FIG. 3*c* can help eliminate the creation of nonsense words by providing longer contiguous periods of playback audio interposed or punctuated with short intervals of generated silence.

Referring to FIG. 3*c*, all audio data occurring during the 30 frame interval of set 1 are retained. In set 2, audio occurring in the initial 25 frame interval can be kept with the remaining 5 consecutive frames silenced. All audio occurring during the 30 frames of sets 3 and 4 respectively can be deleted. In set 5, all the audio within the 30 frame interval is kept. In set 6, audio within the period of the first 25 frames is kept, with audio present during the 5 remaining consecutive frame interval silenced. All audio occurring during the intervals of frames in set 7 and set 8 are deleted. In this way trick mode audio can be generated by concatenating the remaining frames, which can include set 1, set 2, set 5, and set 6. This sequence of audio silence and deletion can be termed a 55-5-60 sequence, wherein a 55 frame duration of audio is kept, the next 5 consecutive frame worth of audio is silenced, and for the duration of the next 60 consecutive frames the audio is deleted. Thus with the exemplary 2× video playback, the 55-5-60 audio processing sequence of FIG. 3*c* yields a 1× audio playback rate during a 2× video trick mode, and as mentioned previously, the pitch of the audio content is substantially unaltered from that produced during normal play speed operation.

FIG. 3*d* illustrates an further embodiment for arranging the selected blocks of audio data in accordance with the inventive arrangements to facilitate audio replay from a 3× video trick mode. Advantageously, the arrangement of FIG. 3*d* can also help eliminate the creation of truncated nonsense words. Referring to FIG. 3*d*, audio data present during all 30 frames of set 1 is retained. In set 2, audio during the first 25 frames is kept with audio occurring in the 5 remaining consecutive frames silenced. Audio data present during the frame intervals of sets 3, 4, 5 and 6 are deleted. In set 7, audio is retained for all the frames of the set. In set 8, audio present during the first 25 frames is kept and audio present in the 5 remaining consecutive frames is silenced. Although not shown in FIG. 3*d*, the next 4 consecutive sets of 30 frames each can be deleted. Once again the trick mode audio playback can be formed by concatenating the remaining audio data segments, which can include that present during set 1, set 2, set 7, and set 8. This selection sequence can be called the 55-5-120 sequence, wherein audio with a 55 frame duration is kept, audio data during the next 5 consecutive frames is silenced, and for the duration of the next 120 consecutive frames the audio data is deleted. Notably, at 3× video playback, the 55-5-120 sequence yields a 1× audio playback during video trick mode wherein the audio content is not substantially altered in pitch.

Those skilled in the art will recognize that other sequences are possible without departing from the spirit of the invention. Importantly, the use of 30 fps as a time reference is wholly intended to teach those skilled in the art how to practice the invention, and is not intended to limit the scope of the invention. Furthermore it is recognized that other TV frame rates exist, for example in various ATSC standards a nominal frame rate of 60 fps is employed and in certain countries a frame rate of 25 fps is utilized, however, the inventive arrangements are equally applicable.

The advantageous deletion and silencing of audio frames yields a 1× audio playback during video trick mode. Thus the resulting audio maintains a close temporal relationship with the video content whilst cycling between an initial lip sync condition and a predetermined maximum amount of slipped syncing. Thus this advantageous arrangement can provide play speed audio delivery with substantially normal pitch whilst maintaining a cyclical or close periodic relationship with the higher speed trick play program delivery rate. This inventive audio sequence control can be of significant importance in applications with limited processing power or capabilities.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when loaded and executed, controls the computer system and a DVD player system similar to that shown in FIG. 1, such that it carries out the methods described herein. The present invention can also be embedded in a computer program product which comprises all the features enabling the implementation of the methods described herein, and which when loaded in a computer system, is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

What is claimed is:

1. A method for playing audio programming during video trick mode playback of a video presentation, the method comprising:
   reading coded digital data comprising video frames and corresponding audio frames;
   periodically dropping selected blocks of said audio frames; and
   interspersing periods of silence between at least some of the blocks remaining after said dropping step to form a signal for audio playback.

2. The method according to claim 1, comprising a further step of:
   controlling said dropping and said interspersing steps to maintain an audio playback rate of between about 1× and 1.5×.

3. The method according to claim 1, comprising a further step of:
   controlling said dropping and said interspersing steps for audio playback of approximately 1× for any video trick mode playback speed.

4. The method according to claim 1, wherein said delineating step comprises the step of:
   selecting said periods of silence by at least one of muting a portion of said remaining set of blocks for audio playback, and inserting a plurality of audio frames coded to represent silence.

5. The method according to claim 1, wherein said delineating step further comprising generating an audio playback signal corresponding to silence for audio playback during said periods of silence.

6. The method according to claim 1, wherein said selecting step includes:
   selecting said remaining set of blocks for audio playback in accordance with a selected speed of said video trick mode.

7. The method according to claim 1, wherein said delineating step comprises:
   selecting said periods of silence of predetermined duration.

8. The method according to claim 7 wherein said periods of silence selected in said delineating step have a duration of at least 100 milliseconds.

9. The method according to claim 1, wherein said storage medium of reading step is selected from the group consisting of a DVD, a magneto optical disk, a magnetic hard disk, a video CD and a solid state memory device.

10. The method according to claim 1 wherein said coded digital data of reading step has an MPEG format and said reading step further comprises decoding an MPEG formatted bit stream to obtain audio samples.

11. An apparatus for playing audio content accompanying video trick mode playback of a video program, comprising:
    a storage medium reader for reading coded digital data from a storage medium, said coded digital data representing video frames and corresponding audio data; and,
    a control processor for selecting blocks of said corresponding audio data to be dropped periodically, and for selecting at least a portion of said blocks remaining for audio playback, and said control processor controllably inserting periods of silence between ones of said remaining blocks for audio playback.

12. The apparatus according to claim 11, wherein said control processor selecting a portion of said blocks remaining for audio playback at a rate of between about 1× and 1.5×, independent of said video trick mode playback speed.

13. The apparatus according to claim 11, wherein said periods of silence are formed by at least one of muting a portion of said remaining set of blocks for audio playback, and inserting audio data representative of silence.

14. The apparatus according to claim 11, further comprising an audio decoder and an audio digital to analog converter for generating an audio playback signal corresponding to said remaining set of blocks for audio playback and said periods of silence.

15. The apparatus according to claim 11, wherein said control processor controls said periodic dropping of said corresponding audio data in accordance with a selected speed of said video trick mode.

16. The apparatus according to claim 15, comprising a storage medium location containing audio data representative of silence wherein said control processor controls reading of said storage medium location containing audio data representative of silence for a predetermined time duration for combining with said remaining set of blocks for audio playback.

17. The apparatus according to claim 11 wherein said periods of silence have a duration between 100 and 300 milliseconds.

18. The apparatus according to claim 11, wherein said storage medium is selected from the group consisting of a DVD, a magneto optical disk, a magnetic hard disk, a video CD and a solid state memory device.

19. The apparatus according to claim 11 wherein said coded digital data is an MPEG format and said storage medium reader comprises a decoder for an MPEG formatted bit stream.

20. A method for playing audio programming during video trick mode playback of a video presentation, the method comprising:
    reading coded digital data from a storage medium, said coded digital data comprising video frames and corresponding audio data;
    periodically dropping selected blocks of said audio data, and selecting at least a portion of blocks remaining for audio playback; and
    inserting audio data representative of silence between ones of said portion of remaining blocks for audio playback.

* * * * *